United States Patent [19]
Smith

[11] 3,790,871
[45] Feb. 5, 1974

[54] INDIVIDUAL AXLE WHEEL SLIP CONTROL SYSTEM

[75] Inventor: Russell M. Smith, North East, Pa.

[73] Assignee: General Electric Company, Erie, Pa.

[22] Filed: Jan. 2, 1973

[21] Appl. No.: 322,896

[52] U.S. Cl.................... 318/52, 318/440, 290/3, 105/61
[51] Int. Cl. ............................................ B61c 15/12
[58] Field of Search.... 318/440, 52, 139; 290/3, 14, 290/17; 105/49, 61

[56] References Cited
UNITED STATES PATENTS

| | | | |
|---|---|---|---|
| 3,737,745 | 6/1973 | Chevangeon et al. | 318/52 |
| 3,366,864 | 1/1968 | Pasculle | 318/52 |
| 3,378,743 | 4/1968 | Weiser | 318/52 |
| 3,183,422 | 5/1965 | Stamm | 318/52 |
| 3,560,816 | 2/1971 | Franzer | 318/52 |

*Primary Examiner*—G. R. Simmons
*Attorney, Agent, or Firm*—Walter Bernkopf; Dana F Bigelow

[57] ABSTRACT

An individual axle wheel slip control system for electric traction motor drives employing series type direct current traction motors is described. With this system an auxiliary source of direct current is connected to the series field winding of each individual traction motor in parallel with and in addition to the normal direct current excitation with the polarity of the auxiliary source of direct current being such that when added to the normal excitation direct current, results in a reduction of the armature current and consequently a reduction in the tractive effort of the traction motor. A field current sensor responsive only to the field current of the traction motor being controlled, is provided along with a phase control circuit which is responsive to the output of the field current sensor and to a reference signal source for establishing a reference median value of field current. The phase control circuit in turn is coupled to and controls the output of the auxiliary source of direct current for increasing the auxiliary field current in response to the field current sensor detecting a sudden decrease in the field current of the traction motor below the reference median value such as which would be produced upon the occurrence of slippage. A rate of change responsive network is coupled to the field current sensor for detecting relatively rapid rates of change in the sensed field current such as would occur with a rapidly accelerating wheel slip. The rate of change network is coupled to and additionally controls the phase control circuit for further increasing the auxiliary field current supplied to the field winding of the traction motor upon the occurrence of rapidly accelerating wheel slip. A sensitivity modifying circuit is provided for decreasing the sensitivity of the rate of change network for increasing values of field current whereby for relatively low values of field current, relatively fast and large auxiliary field current corrections are provided, and for relatively large values of field current, the auxiliary field current correction is slower and of lower value. The wheel slip control system further includes an overload protection circuit that is coupled to and controls the wheel slip control circuit and that is responsive to a current transformer that senses the overall value of the auxiliary field current supplied to the traction motor. By this arrangement the level of auxiliary field current being supplied from the auxiliary direct current source is regulated to some predetermined maximum level upon the current transformer sensing an overcurrent condition.

12 Claims, 6 Drawing Figures

INDIVIDUAL AXLE WHEEL SLIP CONTROL SYSTEM

BACKGROUND OF THE INVENTION

1. Field of Invention

This invention relates to a new and improved individual axle wheel slip control system for traction motor drive systems employing series type direct current traction motors.

2. Background Problem

Wheel slip control systems heretofore used on traction motor drives, except for those equiped with shunt type direct current traction motors, usually correct wheel slip by reducing the power supply from a common power source to all of the traction motors of the drive system. This is accomplished by controlling the excitation of the field winding of the direct current generator used to supply the direct current traction motors. The generator output generally is controlled for other purposes (such as speed control) and an additional wheel slip control readily can be included in such a system without undue redesign. Such systems have been described in a series of articles appearing in the "Railway Locomotives and Cars Magazine," Parts 9 through 15, published between May, 1966 and Jan. 1968. This series of articles was written by Robert K. Allen of the General Electric Company — Transportation Systems Division, located in Erie Pennsylvania, and portions of the articles have been reprinted in booklet form which are available from the publishers — Railway Locomotives and Cars — 30 Church St., New York, N.Y., 10007.

Although these known systems correct wheel slip, they also result in reducing the total tractive effort of all of the traction motors including those which are not slipping. Quite obviously, if only one axle slips and the power to it only is reduced to correct the slippage, then the total tractive effort of the overall traction drive system will be higher during the correction period because the non-slipping motors are continuing to exert maximum tractive effort. In a copending United States Patent Application Ser. No. 208,670 R. J. Chevaugeon & R. M. Smith, inventors — Filed Dec. 16, 1970 for "Wheel Slip Control System," now U.S. Pat. No. 3,737,745 of June 5, 1973, assigned to the General Electric Company, a wheel slip control system is described which is capable of correction of the slippage occurring on a given axle without requiring that the power to non-slipping the motors be reduced. While the system described in this copending application is quite satisfactory for many installations to overcome slippage, it does not possess certain advantageous features made possible by the present invention.

SUMMARY OF THE INVENTION

It is, therefore, a primary object of the present invention to provide a new and improved individual axle wheel slip control system wherein a current measuring reactor senses the field current flowing in each traction motor of the traction motor drive system, compares it to a reference signal level representative of a desired or command median value of field current for a set level of tractive effort, and when wheel slippage is detected by reason of a rapidly decreasing field current, corrects the slippage by introduction of auxiliary field current from an auxiliary source of direct current which is connected across the field winding of the traction motor to thereby correct the slippage by returning the field current to the indicated command median value.

Another object of the invention is to provide a new and improved wheel slip control system wherein if the field current of the traction motor tends to drop rapidly, as would be the case with the rapidly accelerating wheel slip, then the amount of auxiliary field current introduced into the field winding of the slipping motor is increased and the amount of such increase is directly proportional to the rate of change of the field current that initiates it.

Another object of the invention is to provide such a wheel slip control system wherein for wheel slips starting at low field current levels, a relatively high rate of change of velocity occurs for smaller rates of change of field current. Accordingly the system is designed to modulate the sensitivity of the rate of change control as a function of the absolute field current level whereby at low field current levels increased auxiliary field current is supplied with fast response time and at higher levels of field current sensitivity is decreased to provide lower magnitudes of auxiliary field current at a slower rate of response.

A further feature of the invention is to provide a wheel slip control system having the above features wherein an absolute current ceiling is imposed on the rectifiers and supply transformer that comprise the auxiliary source of direct current whereby in the event of a malfunction or an extremely prolonged wheel slip, the amount of auxiliary field current is limited to some safe value within the current and voltage ratings of the components employed in the fabricating the system.

A still further feature of the invention is to provide such a wheel slip control system including a pretest and an alarm relay arrangement for alerting the operator of the traction motor to the fact that wheel slip has occurred, and which may be employed to check the functioning of the wheel slip control system prior to initiating operation of the traction motor.

In practicing the invention, a wheel slip control system is provided for electric traction motor drives of the type employing series direct current traction motors having the field and winding armatures connected in series electrical circuit relationship. An auxiliary source of direct current is connectable to the series field winding of the series traction motor in parallel with and in addition to the normal direct current excitation supply for the motor. The polarity of the auxiliary source of direct current is such that when added to the normal excitation direct current, a reduction of the armature current results with a consequent reduction in the tractive effort of the traction motor. Field current sensing means are provided which are responsive only to the field current of the traction motor being controlled and the sensed field current is compared to a reference signal that establishes a median value of command field current for any desired tractive effort setting of the throttle controlling the traction motor drive system. Wheel slip control means are coupled to control the supply of auxiliary field current from the auxiliary source of direct current to the field winding of the series type traction motor for increasing the auxiliary field current in response to the field current sensing means sensing a sudden decrease in the field current of the traction motor below the reference median value of field current upon the occurrence of slippage.

A rate of change responsive network is coupled to the field current sensing means for detecting relatively rapid rates of change in the value of sensed field current such as would occur with rapidly accelerating wheel slip. This rate of change network is coupled to and additionally controls the wheel slip control means for further increasing the auxiliary field current supplied to the field winding of the traction motor by the auxiliary source of direct current upon the occurrence of rapidly accelerating wheel slip.

Sensitivity modifying means are connected to the rate of change responsive network for decreasing the sensitivity of this network in response to increasing values of measured field current whereby for relatively low values of field current, relatively fast and large auxiliary field current corrections are provided and for relatively large values of field current, the correction is slower and of lower magnitude.

In addition to the above features, an overload protection circuit is coupled to and further controls the wheel slip control means and is responsive to a current transformer that senses the value of the auxiliary field current supplied to the traction motor. Upon the current transformer, sensing that the auxiliary field current exceeds some predetermined maximum level representative of an overdriven condition, the overload protection circuit operates to limit the supply of auxiliary field current to the predetermined maximum level which is designed to be well within the sustained current ratings of the components comprising the system.

A still further feature is the provision of a multiple traction motor drive system employing a multiplicity of series type direct traction motors wherein each traction motor has its own individual wheel control system. A common reference signal source is provided which can be varied over a predetermined range of values representative of command values of field current for all of the series type direct current traction motors in the drive system to thereby establish a common median value of field current below which the wheel slip control means of each individual traction motor takes over to provide auxiliary field current and to its respective motor. With this arrangement, all traction motor drives are conditioned to employ a common median value of command field current, and, should slippage take place in any one of the traction motors, there is an established common reference to which all traction motor operating conditions will be returned by the wheel slip control system comprising the present invention.

BRIEF DESCRIPTION OF THE DRAWINGS

The above and other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein.

DETAILED DESCRIPTION OF PREFERRED EMBODIMENT

Figure 1:
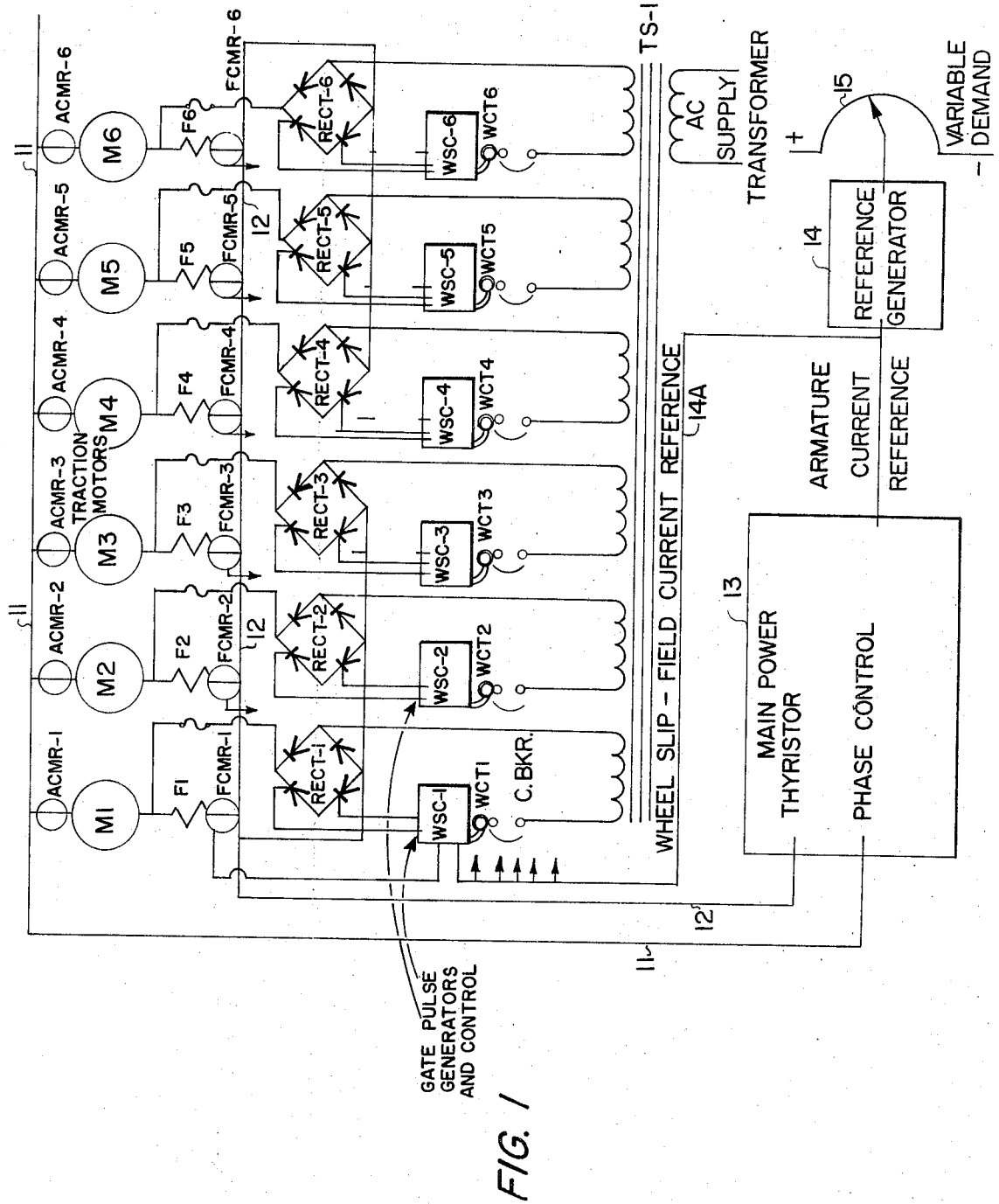
FIG. 1, is a functional block diagram of a new and improved wheel slip control system constructed in accordance with the invention, which is intended for use with a traction motor drive employing a plurality of series type direct current traction motors, and wherein each traction motor has its own individual wheel control system fabricated according to the invention.

FIG. 1 is a functional block diagram of a new and improved wheel slip control system constructed in accordance with the invention and applied to a multiple traction motor drive employing six series type direct current traction motors shown at M-1 to M-6. Each of the traction motors has a field winding F-1 to F-6 connected in series electrical circuit relationship with the armature winding M-1 through M-6 thereof across main power supply terminals 11 and 12 which in turn are supplied from a main direct current power source 13. The main direct current power source 13 may be of conventional construction employing thyristor phase control circuits for varying the main or normal direct current excitation of the traction motors M-1 through M-6. For this purpose, armature current measuring reactors ACMR-1 through ACMR-6 may be included in the armature leads to the respective motors M-1 through M-6 for supplying suitable feedback signals to the main power supply thyristor phase control 13, the details of construction of which do not comprise a part of the present invention.

The field windings F-1 through F-6 of the respective series type traction motors are connected in series circuit relationship with a respective field current measuring reactors FCMR-1 through FCMR-6. The series circuits thus comprised are connected across the output of a respective auxiliary source of direct current comprised by phase controlled rectifier bridges RECT-1 through RECT-6 for supplying auxiliary field current to the respective field windings F-1 to F-6. The polarity of connection of the auxiliary field current sources RECT-1 through RECT-6 is such that the auxiliary field current supplied from these phase control rectifier bridges flows in the same direction, and is added to the normal excitation direct current supplied through the respective field windings by the main power supply terminals 11 and 12. As a consequence of this connection, upon auxiliary field current $I_{AUX}$ being supplied to the respective field windings from their associated phase controlled rectifier bridge networks (which occurs only when wheel slippage of one of the traction motors is detected) the increased field current due to the auxiliary supply causes the series type direct current motor to exhibit shunt motor characteristics so that the tractive effort of the motor rapidly drops off, and the slipping is arrested. For a more detailed description of this phenomenon attention is invited to the above referenced copending application Ser. No. 208,670 now U.S. Pat. No. 3,737,745, issued June 5, 1973.

The phase control rectifier bridge networks RECT-1 through RECT-6 are entirely conventional in their construction and include two gate controlled silicon control rectifier dervices in two of the arms thereof for controlling the magnitude of the direct current produced across diagonally opposite output terminals of the bridges which are connected across respective field windings F-1 through F-6. For a detailed description of suitable phase controlled rectifying bridge networks and their manner of operation, reference is made to the SCR Manual-Fifth Edition-published by the Semiconductor Products Department of the General Electric Company, located at Electronics Park, Syracuse, N.Y., 13201 and in particular to chapter 9 of this manual. Each of the phase controlled rectifier bridge networks RECT-1 through RECT-6 is supplied from a respective secondary winding of an alternating current supply transformer TS-1 whose primary winding may be connected to any suitable source of alternating current supply available in the locomotive, plant, or other locale where the traction motor drive system is installed. The respective secondary windings of supply transformer TS-1 are connected to diagonally opposite supply terminals of the phase control rectifying bridge networks through conventional circuit breakers and respective current transformers CT-1 to CT-6. For additional protection, the diagonally opposite output terminals of the phase control rectifying bridge networks are connected through suitable fusing element across the respective series connected field windings F-1 through F-6 and their associated field current measuring reactors FCMR-1 through FCMR-6.

In order to control the value of the auxiliary field current supplied by the phase controlled rectifying bridge networks RECT-1 through RECT-6 each rectifying network is controlled from a respective wheel slip control means WSC-1 through WSC-6 whose outputs are connected to control the gating of the silicon control rectifier devices included in the phase control rectifying bridge networks. The detailed construction and operation of the wheel slip control means WSC-1 through WSC-6 will be described more fully hereinafter in connection with FIGS. 2-A, 2-B, 3, 4-A and 4-B of the drawings.

Each of the wheel slip control means WSC-1 through WSC-6 is supplied with an input measured field current signal derived by the respective field current measuring reactors FCMR-1 through FCMR-6 for use in controlling the gating of the respective phase controlled rectifying bridge networks RECT-1 through RECT-6. In addition, the wheel slip controls means WSC-1 through WSC-6 are supplied with reference (command) signals over conductor 14A from a reference signal source comprised by a reference generator 14 whose output is controlled by a variable potentiometer 15 that is used by an operator of the equipment to establish the desired levels of reference field current and reference armature current used in controlling the operation of the traction motor drive system. The reference signals supplied from the reference signal generator 14 establish a common reference median value of field current below which the wheel slip control means of each individual traction motor takes over to provide auxiliary field current to its respective motor. This reference signal is representative of the desired common median value of field current and can be varied over a predetermined range of values by an operator of the equipment through appropriate setting of potentiometer 15. It will be appreciated therefore, that if slipping of one of the traction motors occurs, causing a decrease in the armature current of that motor the wheel slip control means associated with the slipping motor individually will correct the slipping by raising its field current and keeping it equal to the value called for by the reference signal supplied from the reference generator 14. Since the same reference signal is applied to all of the wheel slip controls WSC-1 through WSC-6 the command median value of field current will be the same for all traction motors thereby causing the wheel slip controls to regulate about a common command value of field current which is known and controllable. This is in contrast to known wheel slip control systems wherein the regulation of the value of the field current is with respect to the instantaneous value established by the power thyristor phase control 13 and field values of armature current.

FIGS. 2-A, 2-B, 3, 4-A and 4-B illustrate the details of the construction of the respective wheel slip control means WSC-1 through WSC-6 illustrated in block diagram form in FIG. 1. Since the construction of all of the wheel slip control means WSC-1 through WSC-6 is the same, the following description with respect to the wheel slip control means WSC-1 is applicable to all of the wheel slip control means used in the system. In FIG. 2-A the field current measuring reactor FCMR-1 supplies its output through a transformer T-1 have a first secondary winding connected across opposite input terminals of a rectifying bridge BR2. The output from bridge BR2 is a constant current which is proportional to the field current sensed by current measuring reactor FCMR-1, and appears across potentiometer 1R1 and 1R2. The potentiometer 1R1 is used to set the voltage output of bridge BR2 and capacitor 1C1 is used as a filter capacitor. The reference signal supplied from reference generator 14 in FIG. 1 is supplied over conductor 14A and is of opposite polarity to the voltage produced by rectifying bridge BR2. The difference in the two voltages, if any, appears across resistor 8R5 and capacitor 8C4.

Figure 2A:
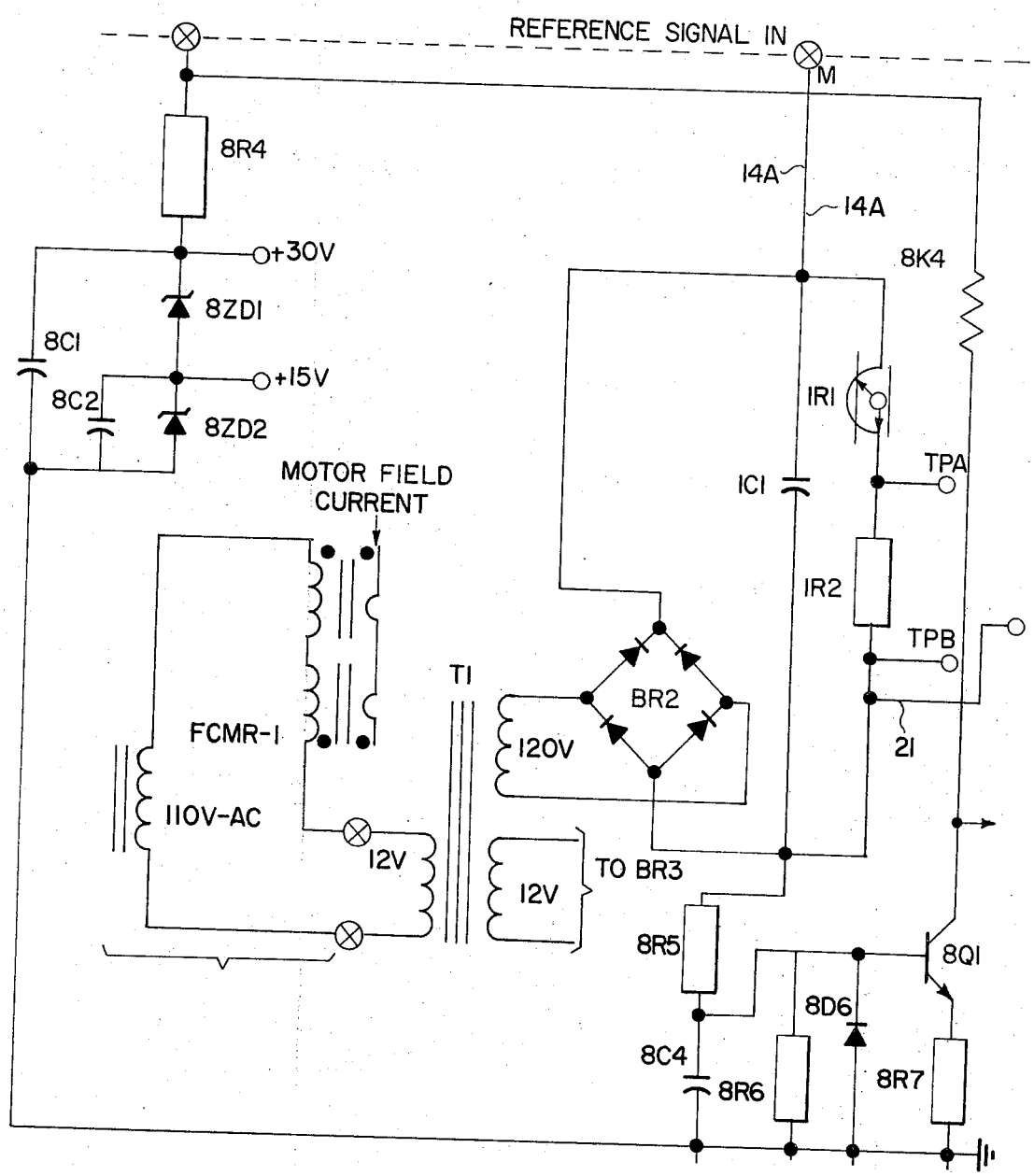
FIGS. 2A and 2B are detailed schematic circuit diagrams showing the construction of the individual wheel slip control circuits used to control wheel slip of each of the series type direct current traction motors employed in the traction motor drive of FIG. 1.
Figure 2B:
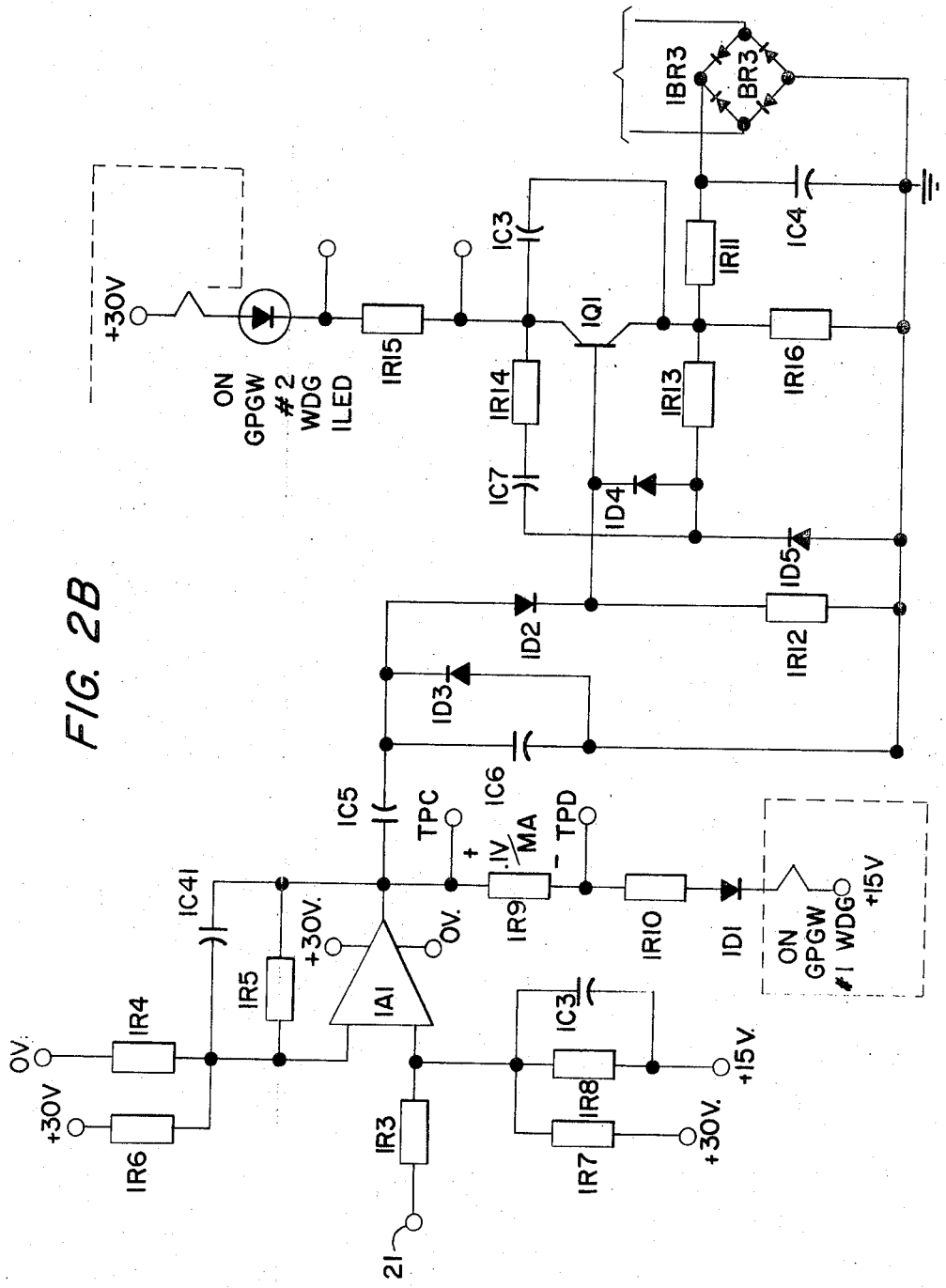

The difference or error signal appearing across resistors 8R5 and capacitor 8C4, is supplied through conductor 21 and resistor 1R3 as shown in FIG. 2B, to the input of an integrated circuit operational amplifier 1A1 of conventional construction. The operational amplifier 1A1 has the usual biasing potentials to it from conventional biasing networks comprised by resistors 1R4 through 1R8 and capacitors 1C3 and 1C41. The error signal supplied over conductor 21 is amplified by operational amplifier 1A1 and supplied through load resistors 1R9 and 1R10 and diode 1D1 to a gate pulse generator winding No. 1 of a gate pulse generator that controls the gating on of the silicon control rectifiers included in the phase control rectifying bridge network RECT-1 supplying auxiliary field current to the field winding F-1 of the traction motor M-1 being controlled. The gate pulse generator (which is not shown) may be a conventional, commercially available, gating control circuit of the magnetic amplifier type such as that manufactured and sold by the Crydom Division of International Rectifiers Company located in Santa Anna, Ca. and described in Bulletin No. 2.20 — Revision No. 2 issued by that company. Gate pulse generators of this type include both turn-on and turn-off windings such as that shown in FIG. 2B as ON-GPGW-1 winding. The current supplied to the ON-GPGW-1 winding will be directly proportional to the amount of the error signal appearing at the output of the operational amplifier 1A1, and will serve to regulate the value of the field current flowing in the field winding of the traction motor about the reference median value established by the reference signal supplied over conductor 14A from the reference generator 14.

In addition to the field current regulating control feature described above, a rate of change responsive circuit is included so that if the field current tends to drop very rapidly as would be the case with a rapidly accelerating wheel slip, then the auxiliary field current being supplied from the phase controlled rectifier bridge is caused to overshoot by virtue of turning the phase controlling SCR's "on" harder in an effort to correct the wheel slip more rapidly and with a greater magnitude of auxiliary field current. The amount of this overshoot is directly proportional to the rate of change of field current that initiates it. For this purpose, if the field current should decrease at a rate of about 80 amps. per second, (for example), the voltage appearing across the capacitor 1C5 connected to the output of operational amplifier 1A1 FIG. 2B, will increase causing current to flow through capacitor 1C5, diode 1D2 and load resistor 1R12. The time constant of the resistor 1R12 and capacitor 1C5 imposes the rate effect described above on the response of this circuit so that the voltage across load resistor 1R12 rises sufficiently to turn-on an emitter — follower amplifier comprised by an NPN transistor 1Q1 and interconnected load resistor 1R16. The base of the transistor 1Q1 is connected to the juncture of load resistor 1R12 and diode 1D2. The resistence value of the emitor load resistor 1R16 is selected so that it does not load-down the resistor 1R12. Accordingly, should the above mentioned rate of decrease of approximately 80 amps per second occur in the field current of the traction motor transistor 1Q1 will be turned-on, and will draw current so as to maintain the voltage across emitter load resistor 1R16 approximately the same as the voltage across the load resistor 1R12.

The collector current of transistor 1Q1 when it is conducting, flows through a second gate pulse generator winding ON-GPGW No. 2 thereby further increasing the magnitude of the auxiliary field current supplied by the phase controlled rectifier bridge RECT-1. Thus, it will be appreciated that the turn-on of the SCR's in the phase controlled rectifier bridge RECT-1 is a function of not only a decrease in the field current as measured by the current measuring reactor but also is a function of the rate of change of this current as determined by the rate network comprising capacitor 1C5, resistor 1R12 and emitter-follower 1Q1.

If after turn-on of emitter-follower 1Q1 in the above described manner, the field current starts to increase (due to the corrective action just described) the situation described above is reversed. As the field current starts to increase, the collector of transistor 1Q1 attempts to become more positive because the signal being supplied from the output of operational amplifier 1A1 starts to decrease in the turn-off direction. Upon this occurrence, current flows through resistor 1R14, capacitor 1C7 and diode 1D4 to the base of emitter-follower 1Q1 thereby delaying the rate of turn-off of transistor 1Q1. This results in delaying the rate at which current flowing through the turn-on gate pulse generator winding ON-GPGW No. 2 can be discontinued thereby assuring that the traction motor torque is allowed to build up at a controlled rate so as to assure that another wheel slip will not be initiated. Diodes 1D4 and 1D5 are included to insure that capacitor 1C7 works in only one direction, and that the discharge of the capacitor is not through the base of transistor 1Q1. Diodes 1D2 and 1D3 perform the same function for capacitor 1C5. Capacitor 1C6 is a smoothing capacitor for smoothing the operation of the rate network. Resistors 1R13 provides a discharge path for capacitor 1C7 around transistor 1Q1 and capacitor 1C3 is a smoothing capacitor connected across the transistor 1Q1 for reducing transient effects.

In order to obtain a desired change in sensitivity of the rate network with changes in level of the field current, a second secondary winding provided on transformer T1 shown in FIG. 2A, is connected to supply alternating current proportional to the sensed field current to a third rectifier bridge BR3. The output of rectifier bridge BR3 is filtered by capacitor 1C4 and supplied through resistor 1R11 across the emitter load resistor 1R16. By reason of this connection, as the field current increases, greater error current must flow through the capacitor 1C5 at the output of operational amplifier 1A1, in order to raise the base of transistor 1Q1 to a sufficiently high level to overcome the modified (increased) bias voltage developed across emitter load resistor 1R16. This results in decreasing the sensitivity of the rate of change responsive network at higher values of field current.

Figure 3:
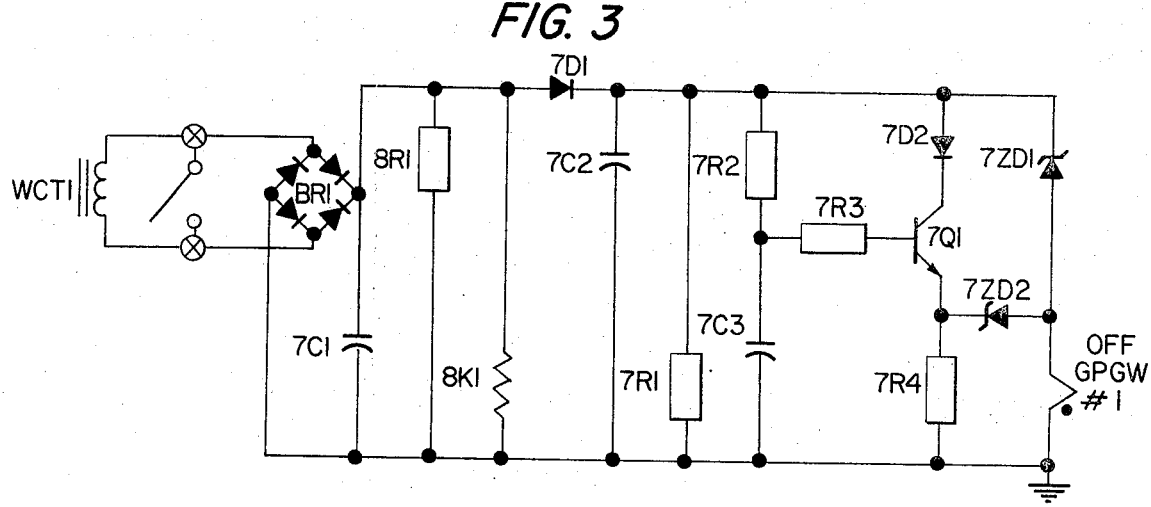
FIG. 3, is a detailed schematic circuit diagram illustrating the details of construction of an overload protection circuit used with the novel wheel slip control circuit shown in FIGS. 2A and 2B.

Overload protection for the wheel slip control is furnished by the subcircuit illustrated in FIG. 3 of the drawings. As shown in FIG. 1 of the drawings, a current transformer WCT1 through WCT6 is placed in one of the AC leads feeding the phase controlled rectifier bridge network for each traction motor. The output from the current transformer WCT1 is supplied to a diode bridge network BR1 whose output is filtered by capacitor 7C1 and supplied across load resistor 8R1. The voltage across 8R1 is monitored by a wheel slip indicating relay winding 8K1 which is picked up strictly as a function of the rectified output voltage of current transformer WCT-1. This voltage is further smoothed by an additional filtering network comprising resistor 7R1, capacitor 7C2 and diode 7D1, and the voltage appearing across the final load resistor 7R1 is applied the a first zener diode 7ZD1. When this voltage reaches a predetermined value set by zener diode 7ZD1, it breaks down and conducts to thereby supply current in the turn-off direction through an off-gate pulse generator winding OFF-GPGW No. 1. This results in reducing the auxiliary field current being supplied by the phase controlled rectifying bridge network RECT-1 to the field winding F-1 due to the fact that the OFF-GPGW No. 1 winding cuts back the point in the phase of the supply alternating current at which the phase controlled SCR's are gated on thereby reducing the output current level of the rectifier bridge. The point at which gating is cut back, is determined by the continuous operation rating of the components comprising the phase control rectifier bridge so as to assure that the components will not be burned up in the case of a malfunction or sustained wheel slippage.

Concurrently with the above described turn-off action of OFF-GPGW winding No. 1 through zener diode 7ZD1 the voltage appearing across the final load resistor 7R1 is also applied across a series connected resistor 7R2 and capacitor 7C3 voltage dividing network. Capacitor 7C3 will be charged through resistors 7R2 at a rate determined by the RC time constant of these two components. As the voltage across capacitor 7C3 increases, it turns-on emitter-follower 7Q1 through resistor 7R3 thereby raising the potential of emitter load resistor 7R4 and causing a second zener diode 7ZD2 to be rendered conductive. Thereafter, turnoff current will be supplied to the off GPG winding 1 to diode 7D2 transistor 7Q1 and zener diode 7ZD2 at a much lower voltage level than that required to maintan conduction through the first zener diode 7ZD1. This has the effect of gradually lowering the overall current level in the phase control SCR's from the initial overcurrent value determined by the first zener diode 7ZD1. The OFF-GPGW winding 1 then will continue to regulate the operation of the phase control SCR's supplying the rectifying bridge network RECT-1 to some safe predetermined level until such time that the slippage or other malfunction is detected and corrected.

In the event of wheel slip, such condition is signalled to the operator by the application of the difference voltage appearing across capacitor 8C4 in FIG. 2A to the base of emitter-follower 8Q1. When 8Q1 is turned-on, it activates (pick-up) a relay 8K4 thereby indicating to the operator that wheel slip has occurred. Relay 8K4 also can be used in the interlock test circuit to be described hereafter with respect to FIGS. 4A and 4B.

Figure 4A:
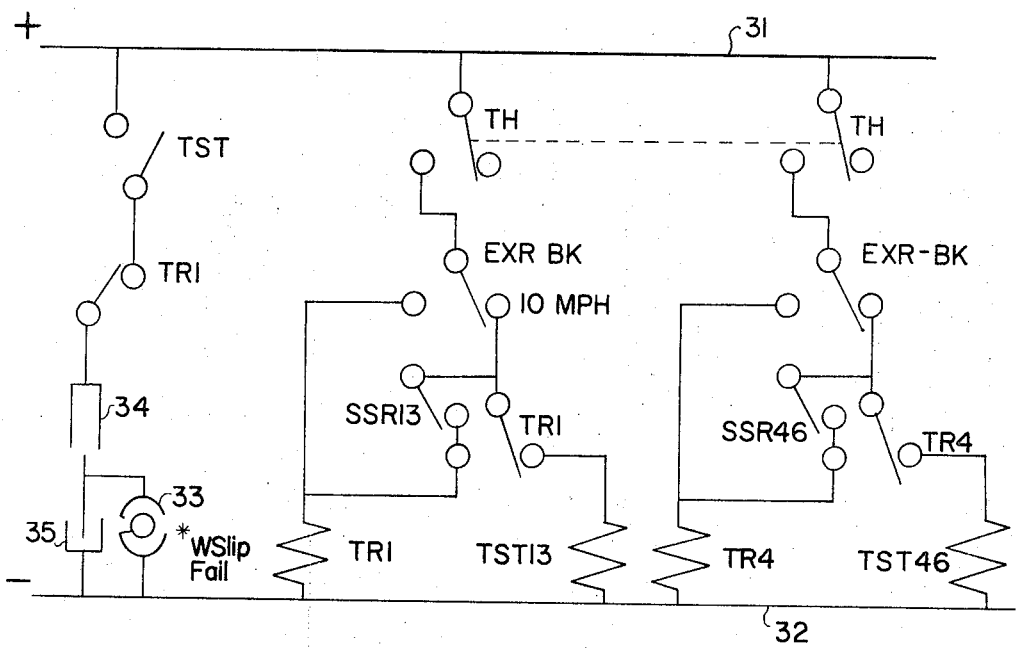
FIGS. 4A and 4B, are detailed circuit diagrams of the pretest and alarm relay network employed in the wheel slip control system comprising the invention.
Figure 4B:
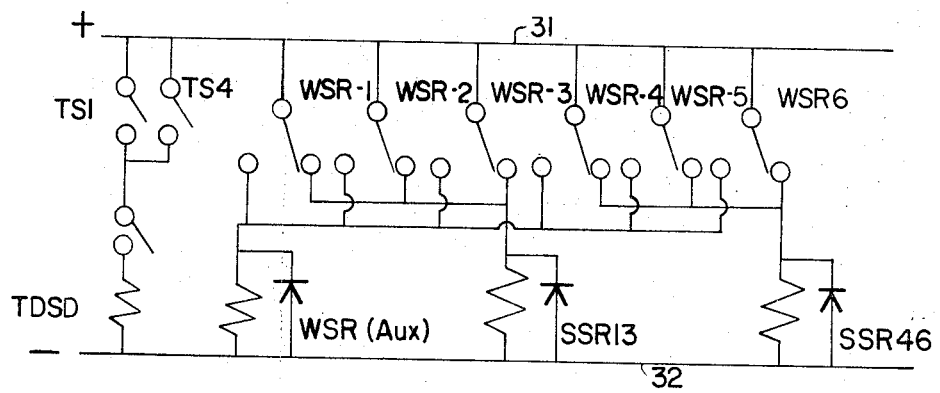

FIGS. 4A and 4B of the drawings illustrate a pretest and an alarm relay network which can be used to precheck the operation of the wheel slip control system in advance of initiating motoring of the traction motor drive, and also to signal a malfunction.

As shown in FIG. 4B, all six of the wheel slip controls are provided with wheel slip detecting relays, that is 1 per axle which are connected to a common DC supply bus 31. Since the traction motors of the traction motor drive are connected in groups of three, the normally closed contact of each of these wheel slip relays are tied together in groups of three to relays SSR13 and SSR46, respectfully. These relays SSR13 and SSR46 normally are picked up anytime control power is available across the D.C. supply buses 31, 32. In operation, if anyone of the wheel slip detecting relays WSR1 through WSR6 is picked up, the WSR (AUX) relay is picked up in turn and does the alarming function and also may be used to start additional functions such as sanding as in the case of locomotive traction motor drives.

Referring now to FIG. 4A of the drawings, if the throttle handle TH is picked up indicating that power is desired by an operator of the traction motor drive, a closed current path is formed through EXR-BK, and TR1 picking up relays TST13 and/or TST46. It should be recalled that at this point that relay SSR13 previously has been picked-up in the manner described above, and consequently TST13 will pick up. One interlock on this relay must prevent any of the main power circuits from being energized and simultaneously apply a signal to the turn-on winding of the gate pulse generator in order to pretest the wheel slip control system. The interlock for performing this function is not shown in FIG. 4A since it may be desirable to do this by appropriate manipulation of the main reference input voltage. Putting a turn on signal into the turn-windings of the gate pulse generator will then turn-on the all of the wheel slips sytems. This results in picking up all three relays WSR-1 through WSR-6 in each group of three which in turn drops out SSR13 and/or SSR46. As a consequence, relay TR1 and/or TR4 will then lock themselves in by shunting out the SSR13 and/or SSR46 relay interlocks and dropping TST13 and/or TST46. Dropping out of TST13 and/or TST46 removes the test signal and results in picking up TR1 and/or TR4 which then allows the power circuit to be completed.

The combination of TST13 and/or TST46 picked up and TR1 and/or TR4 dropped out, is an indication that one or more of the wheel slips circuits is not functioning properly. This combination of interlocks is used to initiate some kind of an alarm action such as the enunciator shown at 33 in FIG. 4A. It is possible for the TST and TR relays to energize the enunciator's transiently, therefore it is necessary to include some kind of delay such as the capacitors 34 and 35 so that the enunciator 33 will not operate until the malfunction condition has been in effect for a predetermined time period of one second or more.

From the foregoing it will be appreciated that each individual traction motor is still a standard series connected traction motor, however, in addition to its normal series direct current excitation connection through the armature, the field of each traction motor is individually connected to a respective phase controlled bridge rectifier which are of the "semi-controlled" type. In other words, two of the arms of the bridge include silicon control rectifiers (SCR's) which can be turned on and off in response to gating control signals for the purpose of correcting wheel slip on each motor individually. The gate pulse generators, for controlling turn-on and turnoff of the SCR's are of the magnetic amplifier type wherein appropriate control signals supplied to the control windings of the magnetic amplifier cause the SCR's turn on and off to modulate their condition as desired.

Under normal operating conditions, with no-wheel slippage is occurring, the phase controlled bridge rectifiers are maintained in a turn-off condition and operation of the traction motors is accomplished through the main power thyristor phase control circuitry 13. If the field current in any of the motors drops, as is the case during wheel slip, then a turn on signal will be supplied to the turn-on winding of the magnetic amplifier controlling the phase control rectifier bridge supplying auxiliary field current to the field winding of the slipping motor. In addition to this balancing feature, a rate of change network is included so that if the field current tends to drop very rapidly as would be the case with a rapidly accelerating wheel slip, then the phase controlled SCR's are turned-on harder in an effort to control the wheel slip more rapidly. The amount of turn-on is directly proportional to the rate of change of the field current that initiates it. After the wheel slid has been corrected as will be noted by a decrease in the field current, there is a slight delay built into the cutback or removal of the auxiliary field current so that the traction motor torque is allowed to build up at a controlled rate that will assure against initiation of another wheel slip. Further it is desirable to have greater sensitivity for the rate of change network at lower field current levels than is required at high levels of field current. The reason for this is that the wheel slip starting at lower field current levels produces relatively high rates of change of velocity for smaller rates of change of current. To make the wheel slip control system have relatively even response over the whole field current range, the sensitivity of the rate of change network is modulated as a function of the absolute field current level.

In addition to the main control arrangement described briefly above, it is desirable to impose an absolute current ceiling on the auxiliary field current supported by the wheel slip control system. The reason for this is that the SCR's rectifiers and supplied transformers are rated on a duty cycle basis since normally they carry current for only short periods of time. However, in the event of a malfunction or an extremely prolonged wheel slip, it is necessary to limit the amount of current that will flow through the SCR's to some predetermined maximum value. This value should be within the continuous ratings of the components comprising the system. If a wheel slip should last for more than three or four seconds, which is quite possible, then the level of current formerly being supplied on a duty cycle basis is reduced to the predetermined maximum continuous rating level which is possible to maintain indefinitely without burning out any of the components.

In any practical system, it is necessary to include fuses and/or circuit breakers at various points in the system. If these should trip it is desirable to known this in order that an operator can initiate appropriate action to correct the condition which caused the fuse to blow or the circuit breaker to open. Accordingly, a pretest and alarm relay network has been incorporated to check the functioning of the wheel slip control. When the operator first activitates the throttle control (or motoring is otherwise initiated), a test relay is first picked up which: (1) prevents the traction motor drive from motoring, (2) applies an output signal to the wheel slip control system. At this point, auxiliary field current will be supplied to all six motors which, of course, will not operate since no armature current is being provided. When all of the traction motors in the group have picked up their wheel slip relays indicating that the wheel slip control system is functioning properly, then a third relay picks up, drops out the initial test relay and allows normal motoring of the traction motor drive to begin. In the event that the test relay does not drop out indicating that the wheel slip engagement is not functioning properly an appropriate alarm is initiated. Thus, it would be appreciated that the overall wheel slip control system is prechecked for operation each time that motoring is initiated.

Having described one embodiment of a new and improved individual axle wheel slip control system constructed in accordance with the invention, it is believed obvious that other modifications and variations of the invention will be suggested to those skilled in the light of the above teachings. It is therefore to be understood that changes may be made in particular embodiment of the invention described which are within the full scope of the invention as defined by the appended claims.

What is claimed as new is:

1. A wheel slip control system for electric traction motor drives employing series type direct current traction motors having the field and armature windings connected in series electrical circuit relationship, the improvement comprising an auxiliary source of direct current connectable to the series field winding of the series type traction motor in parallel with and in addition to the normal direct current excitation supply for the traction motor, the polarity of the auxiliary source of direct current being such that when added to the normal excitation direct current results in a reduction of the armature current with a consequent reduction in the tractive effort of the traction motor, field current sensing means responsive only to the field current of the traction motor being controlled, a reference signal source for establishing a reference median value of field current, and wheel slip control means responsive to said field current sensing means and to said reference signal source, said wheel slip control means being coupled to control the output of the auxiliary source of direct current to the field winding of the series type traction motor for increasing the supply of auxiliary field current in response to said field current sensing means sensing a sudden decrease in the field current of the traction motor below the reference median value upon the occurrence of slippage.

2. A wheel slip control system according to claim 1, further including rate of change responsive network means coupled to said field current sensing means for detecting relatively rapid rates of change in the value of sensed field current such as would occur with a rapidly accelerating wheel slip, said rate of change network means being coupled to and additionally controlling said wheel slip control means for further increasing the auxiliary field current supplied to the field winding of the traction motor by said auxiliary source of direct current upon the occurrence of rapidly accelerating wheel slip.

3. A wheel slip control system according to claim 1, wherein the auxiliary direct current source comprises rectifying means connected to the series connected field winding of the series type traction motor in parallel circuit relationship therewith and alternating current supply network means, connected to the rectifying means, and the wheel slip control means comprises phase control circuit means included in said alternating current supply network means for supplying said rectifying means with phase controlled alternating current, and phase control gating circuit means responsive to the field current sensing means and the reference signal source for controlling the operation of the phase control circuit means to thereby control the auxiliary field current supplied to the field winding of the traction motor.

4. A wheel slip control system according to claim 1, wherein there are a multiplicity of series type direct current traction motors included in a direct current motor drive system with each traction motor having its own individual wheel slip control system, and wherein there is a common reference signal source which may be varied over a predetermined range of values representative of the desired value of field current for all series type direct current traction motors in the motor drive system to thereby establish a common median value of field current with respect to which the wheel slip control means of each individual traction motor regulates the supply of auxiliary field current to its respective motor.

5. A wheel slip control system according to claim 1, further including rate of change responsive network means coupled to said field current sensing means for detecting relatively rapid rates of change in the value of the sensed field current such as would occur with a rapidly accelerating wheel slip, said rate of change network means being coupled to and additionally controlling said wheel slip control means for further increasing the auxiliary field current supplied to the field winding of the traction motor by said auxiliary source of direct current upon the occurrence of rapidly accelerating wheel slip, and wherein the auxiliary direct current source comprises rectifying means connected to the series connected field winding of the series type traction motor in parallel circuit relationship therewith and alternating current supply network means, connected to the rectifying means, and the wheel slip control means comprises phase control circuit means included in said alternating current supply network means for supplying said rectifying means with phase controlled alternating current, and phase control gating circuit means responsive to the field current sensing means and the reference signal source for controlling the operation of the phase control circuit means to thereby control the auxiliary field current supplied to the field winding of the traction motor.

6. A wheel slip control system according to claim 5, wherein the phase control gating circuit means includes silicon control rectifiers connected in the alternating current supply network means and the phase control gating circuit means comprises magnetic amplifier gating pulse generator means having at least one turn-on gate pulse generator winding and one turn-off gate pulse generator winding with the turn-on gate pulse generator winding being coupled to and controlled by the reference signal source and the field current sensing means, as well as the rate of change responsive network means, the magnetic amplifier gating pulse generator means being so arranged that the silicon control rectifiers are maintained off during normal motoring conditions but are rendered conductive in response to the occurrence of wheel slip to thereby supply auxiliary field field current to the series field winding.

7. A wheel slip control system according to claim 6, further including sensitivity modifying means for decreasing the sensitivity of the rate of change responsive network means in response to increasing values of field current whereby for relatively low values of field current relatively fast and large auxiliary field current corrections are provided and for relatively large values of field current the correction is slower and less.

8. A wheel slip control system according to claim 7, further including overload protection circuit means coupled to the turn-off gate pulse generator winding of the magnetic amplifier gate pulse generator means, and current transformer means for sensing the magnitude of the alternating current supplied to the rectifying means, said overload protection circuit means serving to reduce the level of alternating current being supplied from the auxiliary direct current source to some predetermined maximum level upon the current transformer means sensing an overcurrent condition.

9. A wheel slip control system according to claim 8, further including pretest and energizing relay network means connected to the wheel slip control system and responsive to the motoring control of the traction motor for subjecting the wheel slip control system to a malfunction test in advance of the traction motor being energized and thereafter allowing the motor to operate in a normal manner upon no malfunction being detected.

10. A wheel slip control system according to claim 9, wherein there are a multiplicity of series type direct current traction motors included in a direct current motor drive system with each traction motor having its own individual wheel slip control system, and wherein there is a common reference signal source for all series type direct current traction motors in the motor drive system for establishing a common median value of field current with respect to which the wheel slip control means of each individual traction motor regulates the supply of auxiliary field current to its respective motor.

11. A wheel slip control system for electric traction motor drives employing series type direct current traction motors having the field and armature windings connected in series electrical circuit relationship, the improvement comprising an auxiliary source of direct current connectable to the series field winding of the series type traction motor in parallel with and in addition to the normal direct current excitation supply for the traction motor, the polarity of the auxiliary source of direct current being such that when added to the normal excitation direct current results in a reduction of the armature current with a consequent reduction in the tractive effort of the traction motor, field current sensing means responsive only to the field current of the traction motor being controlled, a reference signal source for establishing a reference median value of field current, and wheel slip control means responsive to said field current sensing means and to said reference signal source, said wheel slip control means being coupled to control the output of the auxiliary source of direct current to the field winding of the series type traction motor for increasing the supply of auxiliary field current in response to said field current sensing means sensing a sudden decrease in the field current of the traction motor below the reference median value upon the occurrence of slippage, rate of change responsive network means coupled to said field current sensing means for detecting relatively rapid rates of change in the value of the sensed field current such as would occur with a rapidly accelerating wheel slip, said rate of change network means being coupled to and additionally controlling said wheel slip control means for further increasing the auxiliary field current supplied to the field winding of the traction motor by said auxiliary source of direct current upon the occurrence of rapidly accelerating wheel slip, and sensitivity modifying means for decreasing the sensitivity of the rate of change responsive network means in response to increasing values of field current whereby for relatively low values of field current relatively fast and large field current corrections are provided and for relatively high values of field current the rate of change correction is slower and less.

12. A wheel slip control system for electric traction motor drives employing series type direct current traction motors having the field and armature windings connected in series electrical circuit relationship, the improvement comprising an auxiliary source of direct current connectable to the series field winding of the series type traction motor in parallel with and in addition to the normal direct current excitation supply for the traction motor, the polarity of the auxiliary source of direct current being such that when added to the normal excitation direct current results in a reduction of the armature current with a consequent reduction in the tractive effort of the traction motor, field current sensing means responsive only to the field current of the traction motor being controlled, a reference signal source for establishing a reference median value of field current, and wheel slip control means responsive to said field current sensing means and to said reference signal source, said wheel slip control means being coupled to control the output of the auxiliary source of direct current to the field winding of the series type traction motor for increasing the supply of auxiliary field current in response to said field current sensing means sensing a sudden decrease in the field current of the traction motor below the reference median value upon the occurrence of slippage, overload protection circuit means coupled to and additionally controlling said wheel slip control means, and current transformer means for sensing the magnitude of the auxiliary field current applied to the traction motor, said current transformer means being coupled to and controlling said overload protection circuit means for reducing the level of auxiliary field current being supplied from the auxiliary direct current source to some predetermined maximum level upon the current transformer means sensing an overcurrent condition.

* * * * *